(12) United States Patent
Norrish et al.

(10) Patent No.: US 7,705,270 B2
(45) Date of Patent: Apr. 27, 2010

(54) CONTROL METHOD AND SYSTEM FOR METAL ARC WELDING

(75) Inventors: John Norrish, Bulli (AU); Christopher David Cook, Wombarra (AU); Dominic Cuiuri, Cordeaux Heights (AU); Paul Di Pietro, Fernhill (AU); Gary Dean, Albion Park (AU)

(73) Assignee: University of Wollongong, New South Wales (AU)

( * ) Notice: Subject to any disclaimer, the term of this patent is extended or adjusted under 35 U.S.C. 154(b) by 1041 days.

(21) Appl. No.: 10/516,721

(22) PCT Filed: May 30, 2003

(86) PCT No.: PCT/AU03/00674

§ 371 (c)(1),
(2), (4) Date: Jan. 17, 2006

(87) PCT Pub. No.: WO03/101658

PCT Pub. Date: Dec. 11, 2003

(65) Prior Publication Data

US 2006/0138115 A1  Jun. 29, 2006

(30) Foreign Application Priority Data

Jun. 3, 2002  (AU) ..................................... PS2740

(51) Int. Cl.
*B23K 9/10* (2006.01)
(52) U.S. Cl. .............................. 219/137.71; 219/130.21
(58) Field of Classification Search .......... 219/137.137, 219/137.2, 137.7

See application file for complete search history.

(56) References Cited

U.S. PATENT DOCUMENTS

| 3,968,340 | A | * | 7/1976 | Fernicola .................. 219/130.4 |
| 4,093,844 | A |   | 6/1978 | Fellure et al. |
| 4,546,234 | A | * | 10/1985 | Ogasawara et al. .... 219/130.21 |
| 4,584,458 | A |   | 4/1986 | Tremblay et al. |
| RE33,330 | E | * | 9/1990 | Ogasawara et al. .... 219/137 PS |
| 5,001,326 | A | * | 3/1991 | Stava .................... 219/137 PS |
| 5,750,957 | A | * | 5/1998 | Kilty et al. ............... 219/130.1 |
| 6,031,203 | A | * | 2/2000 | Suzuki et al. .......... 219/130.01 |
| 6,121,691 | A | * | 9/2000 | Renner .................... 290/40 A |
| 6,313,437 | B1 |  | 11/2001 | Soting et al. |
| 6,498,321 | B1 | * | 12/2002 | Fulmer et al. .......... 219/130.33 |
| 2008/0156781 | A1 | * | 7/2008 | Artelsmair et al. ....... 219/130.5 |

FOREIGN PATENT DOCUMENTS

DE  4204661  2/1992

(Continued)

*Primary Examiner*—Quang T Van
*Assistant Examiner*—Hung Nguyen
(74) *Attorney, Agent, or Firm*—Ohlandt, Greeley, Ruggiero & Perle, L.L.P.

(57) ABSTRACT

A method of controlling an arc welding system during a welding process is disclosed. The welding process has a plurality of welding cycles in which a consumable electrode is advanced towards a workpiece. The method includes dynamically regulating a rate of advancement and instantaneous melt rate of the electrode during each welding cycle in response to predetermined events occurring during the welding process. The melt rate may be coordinated with the rate of advancement of the electrode to provide a wide range of stable deposition rates with a shielding gas such as $CO_2$. An arc welding system for carrying out the method is also disclosed.

27 Claims, 7 Drawing Sheets

FOREIGN PATENT DOCUMENTS

| | | |
|---|---|---|
| GB | 2053762 | 2/1981 |
| JP | 56009062 | 1/1981 |
| JP | 60108176 | 6/1985 |
| JP | 06047545 | 2/1994 |
| JP | 11-226734 * | 8/1999 |
| JP | 11226734 | 8/1999 |
| JP | 11267839 | 10/1999 |
| SU | 1743752 | 10/1990 |
| WO | WO00/64620 | 11/2000 |

* cited by examiner

FIG 3

CONTROL METHOD AND SYSTEM FOR METAL ARC WELDING

CROSS-REFERENCE TO RELATED APPLICATION

The present application is a continuation of International Application No. PCT/AU03/00674 filed May 30, 2003, which claims priority to Australian Application No. PS 2740, filed Jun. 3, 2002.

FIELD OF THE INVENTION

The present invention relates generally to welding and more specifically to control methods and systems for use in gas metal arc welding (GMAW).

BACKGROUND OF THE INVENTION

In a typical GMAW process, a welding circuit is established which includes a consumable electrode, a workpiece and a power source. The electrode is generally a solid wire and not only conducts the electric current that sustains the arc, but also melts and supplies filler material into the joint. A shielding gas such as argon or carbon dioxide ($CO_2$) or blends of argon and helium with $CO_2$ and/or oxygen may be supplied during the welding process to support the arc and prevent the molten metal reacting with oxygen and nitrogen in ambient air.

A GMAW process can be made to operate reliably over a wide range of deposition rates when used with an argon or argon-helium based shielding gas. At low deposition (or wire feed) rates, current densities in the wire electrode are low, and the process operates in short-circuit transfer mode. In this mode, the molten droplet formed at the end of the electrode regularly touches the weld pool, and metal transfer is achieved through a combination of surface tension and electromagnetic forces. This mode can be made to operate very stably with correct selection of key process parameters.

As the wire feed rate is increased, the current density must also increase so that the melting rate matches the feed rate. For mean currents of approximately 170 A to 200 A for 0.9 mm diameter wire, the process operates in a globular transfer mode. This mode is characterised by large droplets being detached by a combination of gravity and electromagnetic forces at irregular intervals. The irregular metal transfer results in poor bead appearance and low operator appeal. In these current ranges, the GMAW process is preferably operated in pulsed spray transfer, an open-arc process where the metal transfer is regular and can be precisely controlled by the current wave form. A droplet of consistent size is propelled across the arc at regular intervals with minimal spatter to produce a smooth weld bead of intermediate size.

Above approximately 200 A for 0.9 mm wire, the process transits to spray transfer mode. In this mode, fine droplets having a diameter less than that of the electrode are propelled from the electrode towards the weld pool at a high speed across the open arc. As current is increased, the droplet becomes finer and the electrode end becomes more tapered. The constant metal transfer produces a smooth weld bead. The high current produces high heat input and relatively wide bead. Large fusion areas and deep penetration can also be achieved if the travel speed is high enough to avoid "puddling", but without producing undercut. Due to the large, highly liquid weld pool, the positional capability of this mode is mostly limited to down hand. At very high currents (above 400 A), and where the electrode stick out length is sufficiently long, rotating arc transfer can be produced. Under these conditions, it is thought that the resistive preheating of the electrode is sufficiently high to soften it to a point where it is rotated by the non axial arc forces. If very high deposition rates are required, then a larger electrode is used in spray mode at lower wire feed rates.

Due to the availability of a number of distinct operating modes as mentioned above, the argon-based GMAW process offers the ability to operate over a very wide range of deposition rates for a given electrode size. As such it has been widely used in the welding industry.

The major disadvantage of argon is its comparatively high cost of production, compared to $CO_2$. As $CO_2$ is a by-product of processing such as brewing, it is relatively inexpensive since low temperature distillation equipment is not required. However there are a number of limitations which need to be overcome to using $CO_2$-shielded GMAW for high volume production welding.

The most significant difference between GMAW processes using $CO_2$, and argon based shielding gas is that the $CO_2$ process does not exhibit a spray transfer mode. For low currents (less than 170 A for 0.9 mm wire) the $CO_2$ process operates in dip transfer mode. The overall behaviour is similar to that for argon, but spatter levels tend to be higher and the bead finish is not smooth.

While it is possible to deposit a weld bead using globular transfer by increasing the current, the resulting weld bead has a poor appearance, arc stability is also poor, and spatter is very high.

SUMMARY OF THE INVENTION

An aim of the invention is to provide improved methods and systems for controlling a welding process so as to produce good quality welds at high deposition rates. A particular aim of the invention is to increase the deposition rates which can be achieved using $CO_2$ or mixed shielding gases whilst maintaining good weld quality.

According to one aspect of the present invention there is provided a method of controlling an arc welding system during a welding process having a plurality of welding cycles in which a consumable electrode is advanced towards a workpiece, said method including dynamically regulating a rate of advancement and instantaneous melt rate of said electrode during each welding cycle in response to predetermined events occuring during said welding process.

In one form, the invention may be directed to a method of controlling an arc welding process having a welding cycle in which a consumable electrode is advanced towards a workpiece, where both the instantaneous melting rate of the electrode and the rate of advancement of that electrode are controlled and regulated during the welding cycle. The invention is also directed to a welding system that allows these welding parameters to be controlled and regulated, and a controller for use in that welding system.

A method of controlling an arc welding process according to the present invention has substantial benefit. In particular, this method can be employed to significantly improve the deposition rate whilst maintaining good weld quality. Specifically, it enables the parameters of the welding process to be more finely controlled allowing better control over the growth of the droplet and transfer of that droplet to the workpiece.

In a particularly preferred form, the instantaneous melting rate of the electrode may be controlled by controlling the current waveform generated by the power source. To enable the current to be appropriately controlled, the power source needs to have an adequate response time. Current response rates of 250 A/ms (Amperes per millisecond) have been found to be suitable, but rates above 400 A/ms are preferred.

In one form, a switching power source which incorporates a switching circuit is used to allow control of the current waveform. In an alternative arrangement, a linear power source is used where the output current is regulated through a linear output stage.

In a preferred form, to control and regulate the rate of advancement of the electrode during the welding cycle, an improved electrode (or wire) feed unit is employed in the welding process. In a particularly preferred form, the wire feed unit is able to cause the electrode to reverse. This again provides more opportunity to better control the welding process to allow for good quality welds to be made at high deposition rates.

Similar to the requirement for the power source, the response time of the wire feed unit to instructions to change its feed rate must be fast enough to enable it to be beneficially used in the welding process. Tests have shown that the process operates well if the time taken to stop a 0.9 mm diameter electrode from 40 meters per minute is approximately 2.1 ms, while the time taken to accelerate the same electrode from 40 meters per minute reverse to 40 meters per minute forward is approximately 3.8 ms.

In one form, a controller is used to co-ordinate the control of the rate of advancement of the electrode and the instantaneous melt rate. In a preferred form, the controller monitors the welding cycle to establish when various events occur in the welding cycle and then regulates the rate of advancement and the melting rate in response thereto.

In a preferred form, variables defining the instantaneous melt rate and the rate of advancement of the electrode in the welding cycle are entered into the controller. Each of these variables are referenced to particular stages in the welding cycle so that the controller is able to adjust these parameters during the welding cycle.

In one form, the controller samples conditions during the welding process at regular intervals (say 40 microseconds) and registers the feedback voltage to establish in real time, the occurrence of predetermined events in the welding cycle so as to allow the controller to establish the present stage of the welding cycle. The controller conducts processing steps using information gained from the feedback voltage and from the entered variables to determine whether the rate of advancement or the instantaneous melt rate of the electrode need to be changed and then issues updated reference signals. This updated reference signal may maintain the status quo, or change the parameters if required. In the arrangement where the rate of advancement is determined by the wire feed unit, then the updated reference signal is used to control that unit. Similarly where the instantaneous melting rate of the electrode is controlled by the current waveform generated by the power source, then the reference signal is used to establish the appropriate level of that current waveform.

Controlling both the rate of advancement and the instantaneous melt rate of the electrode can significantly increase the deposition rates in the welding process. In particular, it can allow for faster and more controlled growth of the molten droplet by increasing the wire feed rate and current rate during droplet growth, and can provide more controlled transfer of the droplet to the workpiece, through a reduction in both these parameters.

In a particularly preferred form, the invention can significantly increase deposition rates of a welding process operating in a dip transfer mode. In that mode, the welding cycle comprises an arcing phase where the electrode is spaced from the workpiece and an arc is generated across the space, and a short circuit phase where the electrode is in contact with the workpiece. The welding cycle changes from the arcing phase to the short circuit phase on contact of the molten droplet with the workpiece, and changes from the short circuit phase to the arcing phase after rupturing of a bridge of molten material formed between the electrode and the workpiece.

Being able to substantially increase the deposition rates in dip transfer mode has significant benefits to $CO_2$-shielded welding processes where it is required to operate in that mode to provide satisfactory weld quality. Using the techniques of the invention the inventors have found that it is possible to at least double the deposition rate for a $CO_2$ process operating in dip transfer mode as compared to conventional processes without unduly affecting weld quality.

In a conventional $CO_2$ process operating in the dip transfer mode, the diameter of the droplet grown is generally less than 1.5 times the electrode diameter, and commonly less than the electrode diameter. Increasing the wire feed rate and the current level in an attempt to increase deposition rate causes the $CO_2$ process to transit to globular mode, which is an open arc process. Observations of the process has shown that large droplets having a diameter much larger than the electrode diameter form at the tip of the electrode. While it is possible to deposit a weld bead using a globular transfer in $CO_2$, the resulting weld bead has a poor appearance, arc stability is also poor and spatter is very high. Arc force tends to push the droplet upwards and away from the weld pool, leading to the description of "repelled globular transfer". The large droplets are detached by gravity at low frequencies (less than 10 Hz).

The inventors have found that by controlling the rate of advancement of the electrode and the instantaneous melting rate of the electrode, it is possible to both grow the droplet on the electrode quickly to a size which is significantly larger than the diameter of the electrode, yet still cause the welding process to operate in a short circuit mode while avoiding droplet repulsion and excessive production of spatter. In this way, the operating range of the short circuiting transfer mode is extended and covers a higher range of deposition rates which would normally be associated with the use of either globular or pulsed spray transfer modes, but without incurring the associated disadvantages of these modes in $CO_2$.

The size of the droplet grown on the electrode may vary significantly. However, preferably the droplet diameter is in the order of 1.4 mm to 2.5 mm for a 0.9 mm diameter wire. The size of the droplet that can be grown in any given time is limited as there exists a relationship between the arcing pulse current $I_p$ and pulse time $T_p$ which droplets will be produced and ejected from the electrode. Since free flight transfer is to be avoided in the short circuit transfer in $CO_2$, it is important that the conditions of the welding process (particularly the pulse current and pulse time) are set so that there is no droplet detachment during the arcing phase.

The inventors have found that the relationship between the arcing pulse current $I_p$ and the pulse time $T_p$ is influenced by changes in electrode preheating. Accordingly, in addition to controlling the rate of advancement and the instantaneous melt rate of the electrode, the process may regulate other factors such as those to influence electrode preheating.

One parameter of the welding process which has a direct influence on electrode preheating is the contact tip to workpiece distance (CTWD).

The inventors have found that using high CTWD can further significantly increase the deposition rates whilst maintaining good weld quality. An advantage of a high CTWD, is that it produces electrode resistive preheating as there is additional time that the electrode material is exposed to current flow prior to entering the welding arc zone. With the changes in electrode preheating, the electrodes are able to be subjected to higher melting rates without droplet detachment. Further, an increase in the CTWD effectively reduces the magnitude of the current required to produce a given droplet in a given time, and simultaneously reduces the arc force acting on the weld pool.

In conventional $CO_2$ welding, the CTWD is in the order of 10 mm to 20 mm. Preferably using the process of the present invention, the CTWD is in the order of 10 mm to 50 mm.

As the deposition rate is increased by being able to grow larger droplets more quickly, it is desirable in a welding application to increase the welding travel speed rather than produce larger weld beads at a slow travel speed. If the droplet transfer rate is too low for high travel speeds, then the weld bead will become "lumpy" or even discontinuous. Therefore, in a preferred form the droplet transfer rate is greater than 30 Hz and more preferably is greater than 45 Hz.

In a preferred form, during the arcing phase, the instantaneous melting rate and the rate of advancement are higher than in conventional $CO_2$ process so as to grow the droplet quickly and to a size which is larger than the electrode diameter. The parameters of the process are then changed to ensure that a short circuit will initially occur by increasing the rate of advancement to force the droplet into the workpiece and further that the short circuit will then rupture, by subsequently reducing the rate of advancement of the electrode.

In a particularly preferred form, the electrode is caused to reverse during the short circuit phase to prevent short circuit stubbing of the electrode tip into the weld pool. When a constant wire feed speed system is used at increasingly high speed, it becomes quite difficult (and eventually impossible) to rupture the short circuit. Significantly greater short circuiting currents are required, because the length of the molten bridge changes during the duration of the short. For example, at 18 meters/minute the bridge length will reduce by 1.2 mm during a 4 millisecond short. By reducing or reversing the electrode feed during the short circuit, this mechanism for stubbing is avoided. In addition, the reversal of the electrode ensures that the short circuit can be interrupted with lower current than that necessary for a constant wire feed speed system.

In a further form, the invention relates to a method of controlling an arc welding system using a shielding gas and operating in a dip transfer mode, the welding system including a power source and a consumable electrode which in use is operative to be advanced into contact with a workpiece, the welding system being operative to create a welding circuit which is energised by the power source and which has a welding cycle including an arcing phase where the electrode is spaced from the workpiece and an arc is generated across the space, the arc being operative to form a molten droplet on the end of the electrode, and a short circuit phase where the electrode is in contact with the workpiece, the welding cycle changing from the arcing phase to the short circuit phase on contact of the molten droplet with the workpiece, and changing from the short circuit phase to the arcing phase after rupturing of a bridge of molten material formed between the electrode and the workpiece, the method including the steps of:

(i) conditioning the welding system to form a molten droplet on the electrode end during the arcing phase which has a diameter greater than the diameter of the electrode, and (ii) causing the droplet to detach from the electrode after the molten droplet has come into contact with the workpiece to thereby ensure a short circuit and arcing phase occurs in the welding cycle.

In preferred embodiments of the invention the molten droplet formed on the end of the electrode during the arcing phase may be between 1.1 to 2.3 times the diameter of the electrode.

In a preferred embodiment according to a further form of the invention, the duration of the arcing phase is within the range of 5 milliseconds to 50 milliseconds, and the short circuit phase is within the range of 2.5 milliseconds to 10 milliseconds.

This further form of the invention is ideally suited to be used in conjunction with the first form of the invention to adjust the parameters of the welding process to appropriately condition the welding system.

Preferably, the average rate of advancement of the electrode towards the workpiece is greater in the arcing phase than in the short circuit phase. Further, preferably the welding current is controlled so that average current rate is greater in the arcing phase than in the short circuit phase. Controlling both these parameters allows the droplet to be grown quickly to the desired size in the arcing phase.

Preferably the method includes controlling the current during the welding cycle so that the droplet contacts the workpiece to cause the short circuit at reduced current to thereby minimise spatter created by the repulsion forces at the contact point.

In yet a further preferred form, the rate of advancement of the electrode towards the workpiece is reduced substantially during the short circuit phase so as to ensure the successful termination of the short circuit. In a particularly preferred form, the electrode feed is caused to reverse during the short circuit phase.

In yet a further preferred form, a current pulse is applied during the short circuit phase to reduce the time taken to transfer the molten metal from the droplet to the workpiece. Preferably the short circuit current pulse is controlled in the welding system so that the end of the pulse occurs before the completion of the short circuit phase.

According to a further aspect of the present invention there is provided an arc welding system including a power source, a control unit and means for advancing a consumable electrode towards a workpiece during a welding process, said consumable electrode being energized by said power source to cause said electrode to supply molten material to said workpiece, wherein said means for advancing is controlled by said control unit to dynamically regulate a rate of advancement of said electrode in response to predetermined events occurring during said welding process.

BRIEF DESCRIPTION OF THE DRAWINGS

It is convenient to hereinafter describe an embodiment of the present invention with reference to the accompanying drawings. It is to be appreciated that the particularity of the drawings and the related description should be understand as not superseding the generality of the preceding broad description of the invention.

In the drawings:

FIG. 3 is a typical user interface screen for the controller of the welding system of FIG. 1;

DETAILED DESCRIPTION OF THE DRAWINGS

Figure 1:
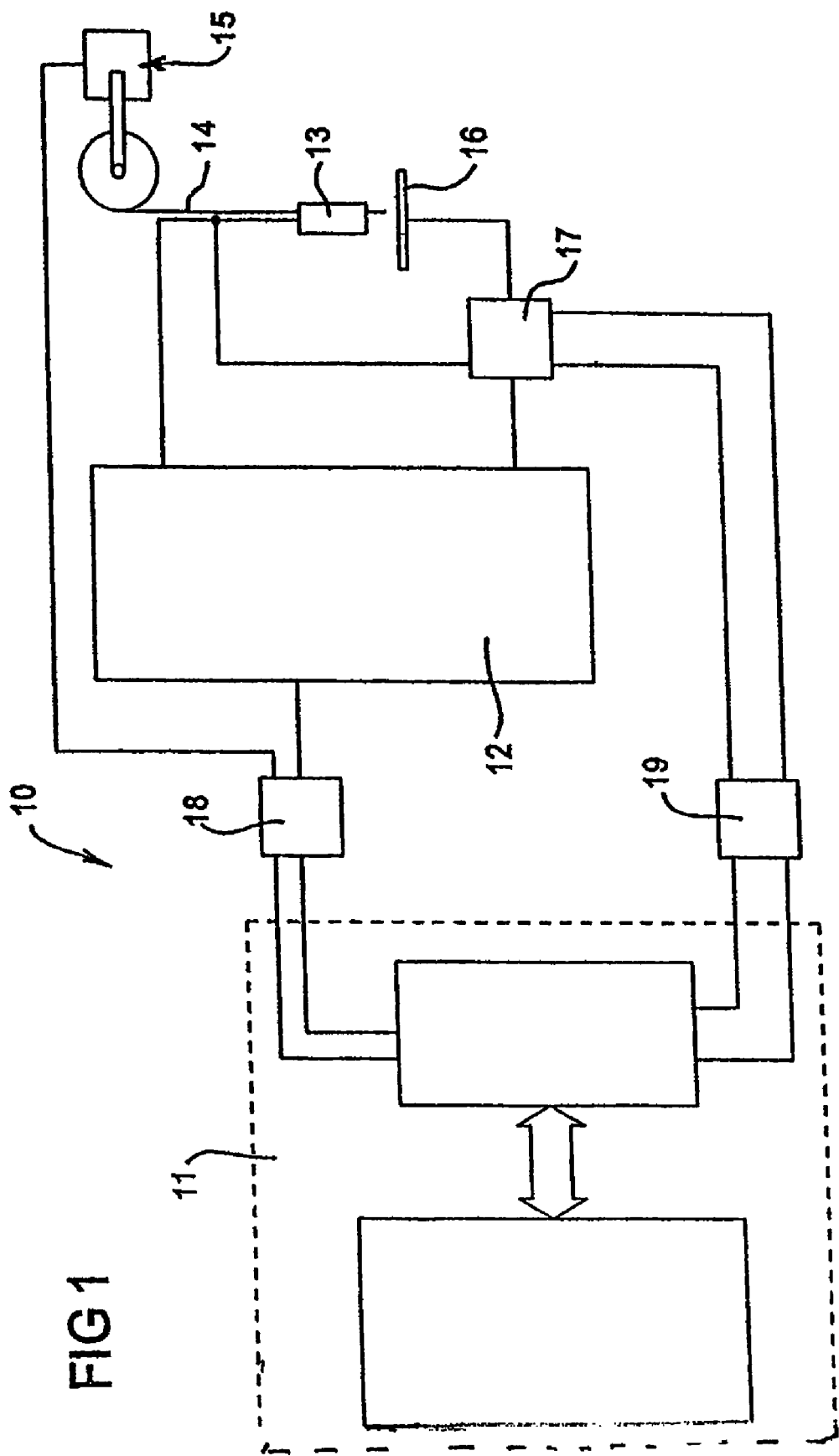
FIG. 1 is a block diagram of a welding system.

Turning firstly to FIG. 1, a welding system 10 is illustrated which includes a control unit 11, welding power source 12 which is connected to a welding torch 13. A consumable metal electrode 14 is fed into the welding torch 13 under operation of a reversible wire feed unit 15. The consumable electrode is energised by the power source 12 which causes the electrode to melt to thereby supply molten metal to a workpiece 16.

The welding system also include a feedback unit 17 which is connected between the workpiece 16 and the power source 12. The feedback unit 17 supplies voltage and current feedback to the control unit 11. The system also includes a signal reference unit 18 and a feedback isolation unit 19 to provide integrity to the welding system. The control unit 11 is able to supply through the signal reference unit 18 reference signals to both the power source 12 and the wire feed unit 15 so as to control the functions of those units as will be described in more detail below.

Figure 2:
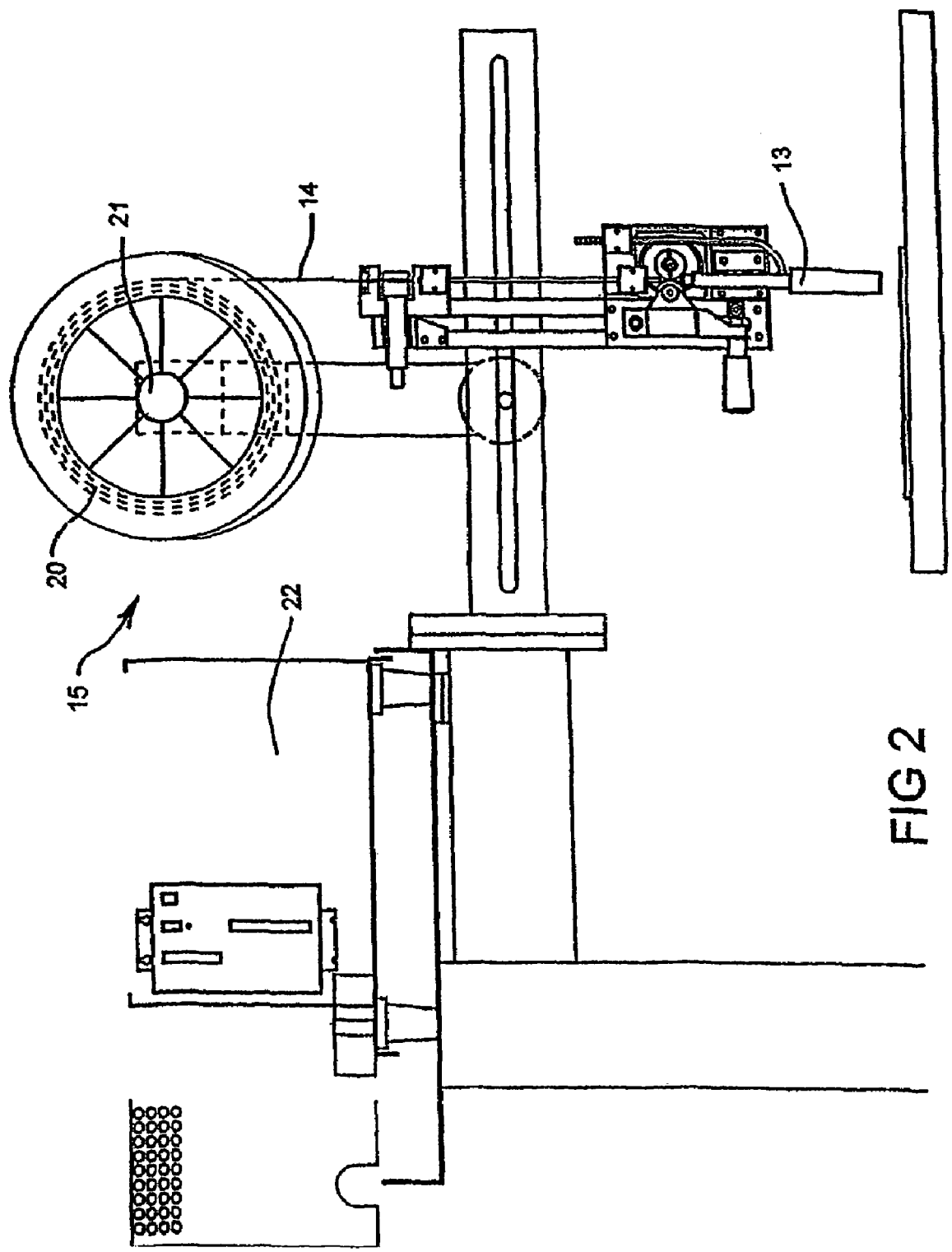
FIG. 2 is a detailed schematic view of a reversing wire feed unit used in the system of FIG. 1.

FIG. 2 illustrates the reversing wire feed unit 15 in more detail. The unit 15 includes a wire feed roll 20 which is located close to the contact tip (ie the outer tip of the electrode) and is driven by a drive motor 21 located approximate to the axis of the roll 20. The drive motor is a commercially available low inertia permanent magnet AC servomotor, which in turn is controlled by a microprocessor based variable speed drive 22. Baldor servomotor BSM63A-375M and matching drive unit FD2A07TR-RN20 are examples of suitable equipment. The distance between the wire feed roll and the contact tip is minimised to avoid wire "springing" effects and ensure that any movement at the tip of the electrode corresponds to the controlled motion at the feed roll. The time taken to stop 0.9 mm diameter wire from full speed (40 meters per minute) is approximately 2.1 ms, while the time taken to accelerate wire from 40 meters per minute reverse to 40 meters per minute forward is approximately 3.8 ms.

The power source 12 consists of a switching-type converter circuit to supply the desired welding current during the arcing phase at high efficiency, and an independent parallel-connected linear output stage to supply current at high response rate during the short-circuiting phase. The use of the linear output stage ensures that the current can be rapidly reduced through the short-circuited output, a function that cannot be performed by a conventional switching-type converter circuit without resorting to use of secondary switching transistors, such as taught by Nakanishi et al in U.S. Pat. No. 4,544,826. The introduction of secondary switching transistors creates additional conduction losses during the arcing phase. Although the linear output stage is more inefficient than the switching-type converter, it is only operated during the short circuiting phase, which is typically less than 25% of the total welding cycle. In addition, the current needs to be supplied at a lower voltage than that developed during the arcing phase, so equipment rating and electrical losses can be minimised.

The control unit 11 comprises a computer interfaced with a digital signal processor (DSP). The DSP is used to control the current reference signal to the power source 12, as well as the wire feed reference signal to the wire feed unit 15. The DSP also monitors in real time the voltage and current feedback. The DSP is housed in a standard desktop personal computer.

The DSP card has on board analogue and digital input and output points, to interface with external equipment. The operation of this card is independent of the PC operating system, allowing for uninterrupted real time control of the welding process. Control of the DSP is through custom developed software especially for the welding application. The control unit 11 does not need to comprise a computer with a compatible DSP, all the functions of the controlled computer in the DSP can be performed using a microprocessor or electronic hardware system.

In operation, the DSP is designed to sample conditions every 40 microseconds. During sampling, electronic circuitry interrupts the DSP programme. The DSP then registers the feedback voltage (and current if required), conducts processing steps and issues an update current reference signal to the power source and an updated wire feed reference signal. The current reference signal controls the current level outputted by the power source which in turn determines the instantaneous melt rate of the electrode 14 at its contact tip 13. The control unit 11 also provides a wire feed reference signal to the speed drive 22 of the wire feed unit 15 which in turn controls the AC servomotor to control the rate of advancement of the electrode towards the workpiece 16.

Figure 3:
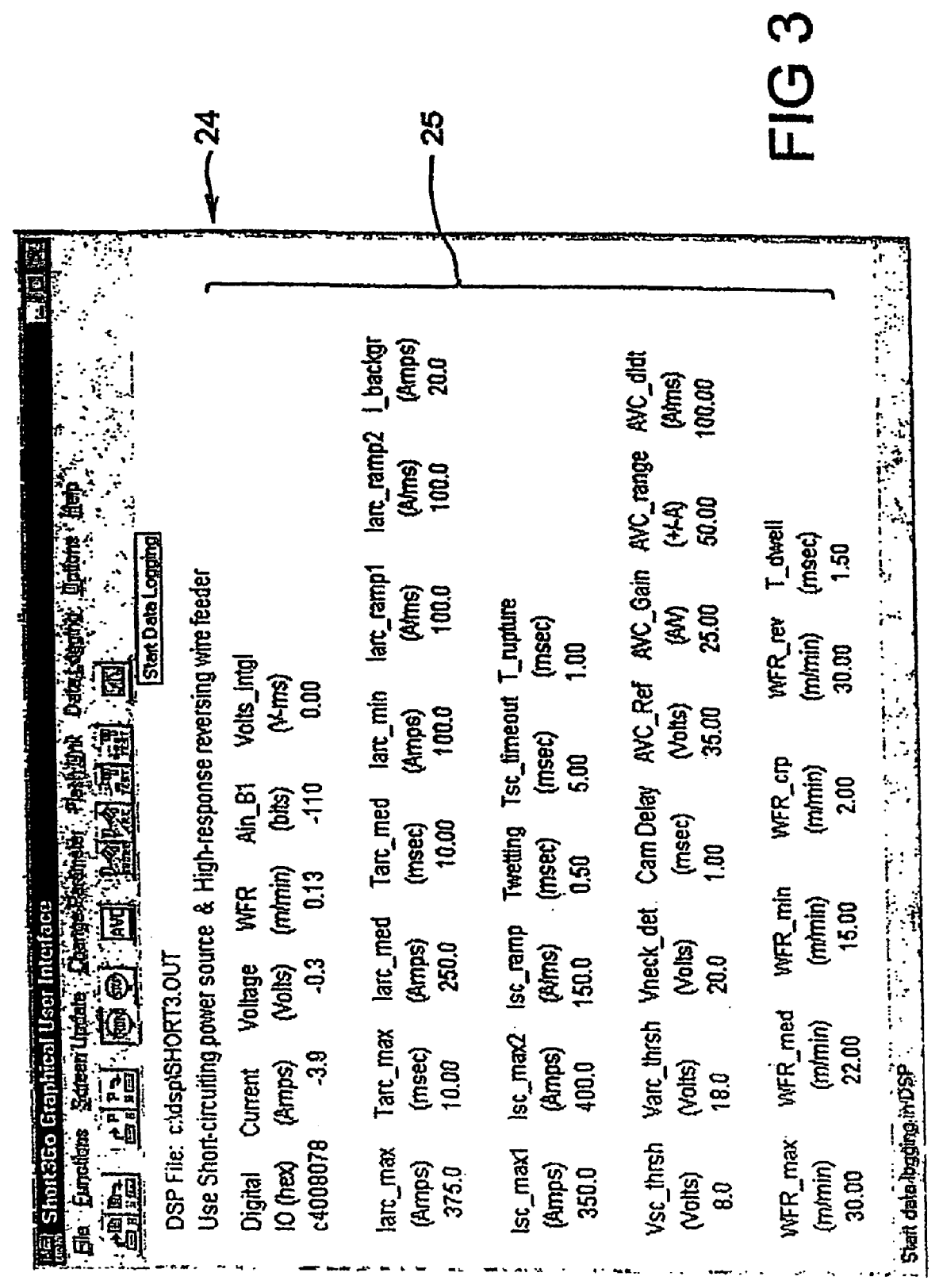

Numerous variables are entered into the control unit 11 via a user interface screen 24 shown in FIG. 3. These variables 25 establish the desired current levels and the wire feed rate as well as other parameters in the welding process as discussed in more detail below with reference to FIG. 4.

Figure 4:
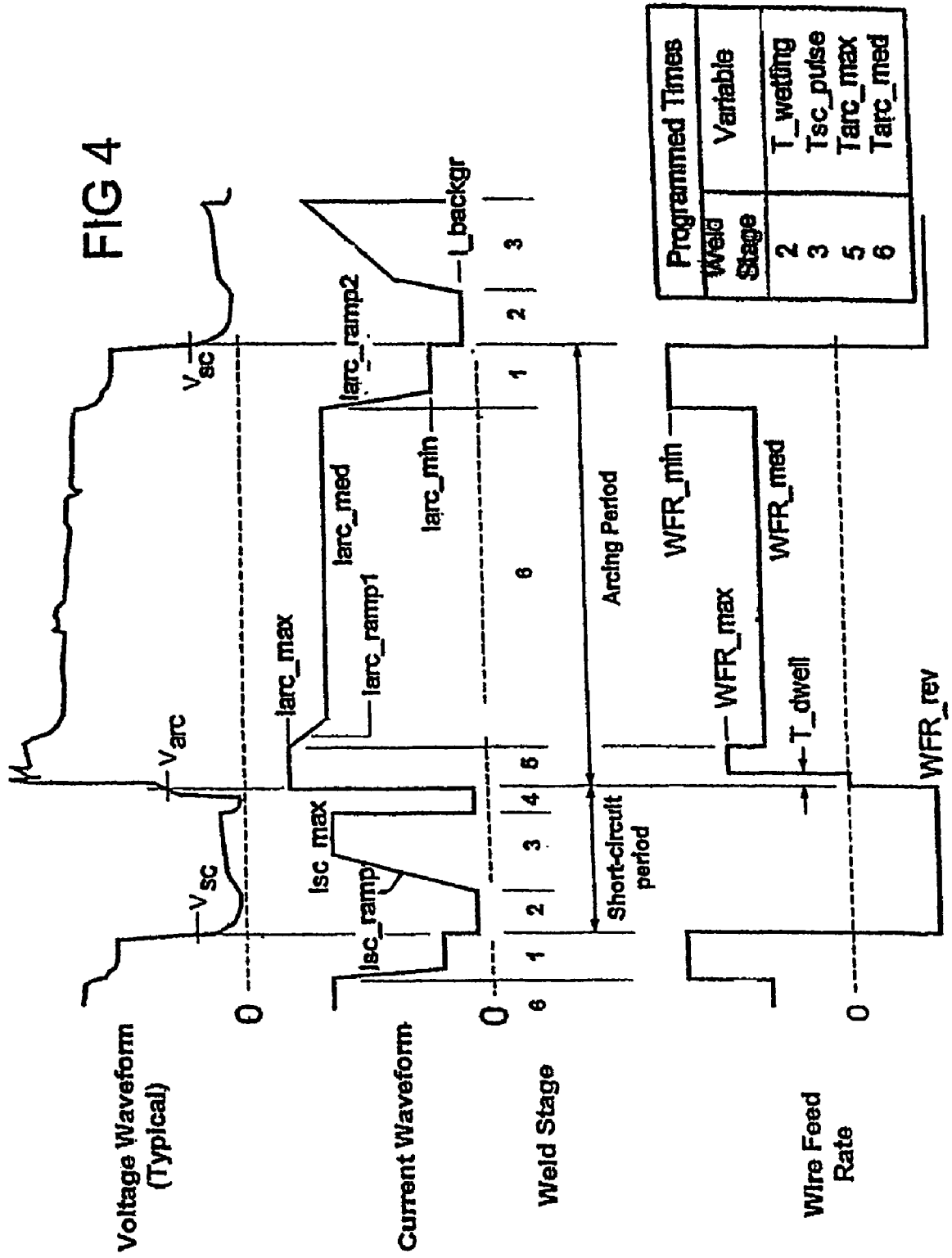
FIG. 4 is a typical waveform for current, wire feed speed and welding voltage used in the welding system of FIG. 1.

The control method controls the current waveform to control the instantaneous melting rate of the electrode and the instantaneous wire feed rate in response to events in the process, as signaled by the voltage feedback. Typical reference waveforms for current and wire feed rate, as well as welding voltage, are shown in FIG. 4. The shape of the voltage waveform is typical of that observed during tests. The figure depicts one complete metal transfer cycle in the process. The descriptions of key parameters (such as "Iarc_max") are included in the figure, as these will be used in description below.

The process is considered to proceed in several distinct stages. Stages 2, 3 and 4 constitute the short-circuiting period, when the droplet forms a bridge connecting the electrode tip to the weld pool. Stages 5, 6 and 1 constitute the arcing period, when the droplet is formed at the tip of the electrode, and the arc contributes to workpiece heating. The short circuit period is typically 2.5 to 6 milliseconds in duration, while the arcing period lasts typically 5 to 50 milliseconds. The typical range of dipping frequency is 20 to 100 Hz.

Stage 6 has the longest duration, and contributes the greatest amount of heat input to the workpiece. The wire is fed forwards into the process at the nominal rate. The current is chosen to balance the feeding rate with the melting rate, so that as the droplet is formed on the tip of the electrode, the arc length decreases slowly but is sufficient to avoid an accidental short circuit. The change in arc length at a constant current is reflected in the voltage waveform. For a 0.9 mm electrode feeding at 20 m/min (790 in/min) with a CTWD (contact tip to workpiece distance) of 12 mm, the balance current is approximately 325 A. This current is maintained for the appropriate time, and this approximately determines the droplet size and dipping frequency. For controlling purposes, the process is then considered to enter stage 1, although the process continues to arc.

In stage 1, the current is rapidly reduced (Iarc_ramp$_2$) to a background level (I_backgr, say 25 A), and the wire feed rate is increased to a higher level (note that WFR_min is not necessarily less than WFR_max or WFR_med; the nomenclature of WFR_min coincides with Iarc_min). These steps are intended to promote the onset of the next short circuit. The reduction in arc force also removes weld pool depression, which should assist in reducing the duration of this stage. It is desirable to minimise the duration of this stage, because there is very little contribution to heat input at the background current. It is also desirable to make the short circuit occur at low current, to minimise ball repulsion spatter. Regular short circuiting at 300 A would produce unacceptably high spatter levels. Current Iarc_min is less than 125 A, and generally around 80 A. Unlike stage 6, the duration of stage 1 is not directly controlled, although it is influenced by Iarc_min, Iarc_ramp2, arc length and WFR_min. Stage 1 duration is dependent on the behaviour of the process, so the control method is inherently adaptive to the process. When the short circuit is detected (voltage drops below Vsc in FIG. 3), the stage 2 period begins. For a fixed duration of T_wetting (usually 0.5 ms), the current is maintained at background level (approximately 20 Amperes) to promote wetting of the droplet into the weld pool and to avoid repulsion. At the beginning of this stage, the wire feeding is reversed. As stated previously, the mechanism requires 2 ms to stop the electrode, so there is no chance of the short circuit being broken by taking this action.

In stage 3, the current is allowed to increase to value Isc_max for specified time Tsc_pulse, producing an electromagnetic pinch force which pumps the molten metal from the droplet into the weld pool. Simultaneously, the tip of the electrode comes to a halt and then begins to reverse away from the weld pool. This is vital to avoiding stubbing at high wire feed rates. The purpose of the current pulse during the short circuit is to appreciably reduce the duration of the metal transfer, compared to the time that would be required if no current were applied, and transfer would occur solely under the influence of surface tension forces. The duration of the pulse is specified so that the current pulse is removed before the short circuit ruptures in stage 4. In this way, the rupturing of the short circuit occurs at reduced current to minimise spatter and weld pool disturbance. The value of Tsc_pulse can be automatically altered by the controller, based on the performance of the process in previous weld cycles, so that the short circuit rupture does not occur during stage 3. As described earlier, the power source is designed so that a rapid current turnoff into a short circuit can be achieved within a suitably low time (typically less than 350 microseconds, and preferably less than 100 microseconds).

During stage 4, the current is reduced to the background level and the short circuit rupture occurs at reduced current. The reverse motion of the wire guarantees this event. Another advantage of the reversal is that a lower maximum short-circuiting current (Isc_max) can be used, compared to the value needed for constant wire speed systems to ensure that a timely rupture occurs. A further advantage is that the onset of the short circuit rupture does not need to be predicted (as taught in U.S. Pat. Nos. 4,546,234 and 4,954,691) since the short circuiting current is already low enough in stage 4 to avoid spatter and weld pool disturbance. Alternatively stage 4 can be removed from the control method and the duration of stage 3 extended until short circuit rupture (as taught in U.S. Pat. No. 6,512,200). When the voltage feedback exceeds Varc, the short circuit neck has ruptured and arcing has commenced. As for stage 1, the exact duration of stage 4 is determined by the process, although the control parameters do influence the average value of these times.

The control parameters of stage 5 produce the initial conditions for the arcing period. The electrode is brought to a standstill, and the current can be increased to a level higher (Iarc_max) than the nominal arcing current (Iarc_med) of stage 6. This establishes the initial arc length, which must be long enough to avoid premature short circuiting due to oscillatory motion of the weld pool. The ability to hold the electrode stationary while extending the arc length means that the stage 5 current does not need to be much greater than the nominal arcing current. This avoids excessive weld pool depression, disturbance, spatter and possible excessive arc gouging of the workpiece which would otherwise occur for systems using constant wire feed speed. Note that the electrode holding time T_dwell can be less than Tarc_max, and can also be extended into stage 6 if necessary. The wire feed speed during stage 5 can be higher than the value in stage 6. In some situations, it is desirable to promote very rapid droplet growth while maintaining a constant arc length at high current, since there is less chance of droplet detachment from the electrode when it is small. If the high current does not cause molten metal to be ejected from the weld pool, then the average melting rate (hence deposition rate) can be increased.

EXAMPLES

A range of experiments have been carried out using 0.9 mm and 1.2 mm diameter steel electrodes. The welding parameters were progressively adjusted to produce the highest deposition rate at certain CTWD values, while maintaining low spatter, high stability and good bead appearance. The results are summarised as follows:

TABLE 1

Summary of maximum deposition rates

| Wire type AWS A5.18 | CTWD mm | Avg wire feed rate m/min [in/min] | Deposition rate kg/hr [lb/hr] | Mean current Amperes |
| --- | --- | --- | --- | --- |
| 0.9 mm ER70S-6 | 12 | 17.5 [690] | 5.2 [11.1] | 250 |
| 0.9 mm ER70S-6 | 35 | 21.0 [830] | 6.3 [13.4] | 180 |
| 1.2 mm ER70S-4 | 16 | 10.0 [395] | 5.3 [11.3] | 290 |
| 1.2 mm ER70S-4 | 35 | 13.5 [530] | 7.1 [15.1] | 245 |

The welding parameters and weld statistics for selected welds in each of the four and additional categories are listed below in Examples 1 to 6. The experiments conducted have been aimed at establishing the limits of the control method described above, using the equipment described. It should be noted that the welds performed at these deposition rates shown in Table 1 are achieved using conditions which were consistently repeatable, and not at the edge of the performance envelope. For example, the 1.2 mm ER70S-4 electrode at a CTWD of 35 mm has been operated at 16.0 m/min (refer to Example 4). However, at this deposition rate the spatter level was considered unacceptably high (visual assessment), although the bead quality had not significantly deteriorated in comparison to that at 13.5 m/min. It should also be noted that for deposition rates below those specified in Table 1, it is a straightforward exercise to find parameter sets that produce excellent welds of high stability and low spatter. The parameters become progressively more difficult to select as the limits of the process are approached.

In analysing the welding statistics provided in Examples 1 to 6, it is possible to determine the average droplet size formed on the electrode during the weld runs using the following equation:

$$d_{drop} \approx \sqrt[3]{1.5 d_e^2 \frac{WFR_{avg}}{f_{sc}}}$$

where:
- $d_{drop}$ is the approximate droplet diameter in millimeters
- $d_e$ is the electrode diameter in millimeters
- $WFR_{avg}$ is the average wire feed rate in millimeters per second
- $f_{sc}$ is the average short circuiting frequency per second All welds in the examples had a diameter which was significantly greater than the diameter of the electrode. Specifically, the average droplet size in the examples was in the range of 1.43 to 2.45 times the diameter of the electrode. This droplet growth is achieved quickly, with the dipping time frequencies being in the range of 33 Hz to 96 Hz. Further, the parameters of the welding process were controlled so that inadvertent droplet detachment did not occur as disclosed in more detail below.

Example 1

Statistics and Parameter Settings for Selected Welds:

0.9 mm AWS A5.18 ER70S-6 electrode, 12 mm CTWD, $CO_2$ shielding.

TABLE A3-1

| File/Weld | Avg wire feed rate (m/min) | Short-cct frequency (Hz) | Stability index | Mean current (Amps) | RMS current (Amps) | Mean voltage (Volts) | Travel speed (mm/min) | Heat input (J/mm) | Mean dip time (ms) |
|---|---|---|---|---|---|---|---|---|---|
| W1115 | 17.1 | 48 | 0.84 | 194 | 235 | 27.4 | 390 | 911 | 3.83 |
| W1120 | 18.7 | 42 | 0.75 | 264 | 286 | 25.6 | 390 | 1127 | 4.52 |
| W1130 | 17.2 | 62 | 0.84 | 246 | 272 | 25.4 | 390 | 1106 | 2.92 |
| W1300 | 17.4 | 54 | 0.87 | 233 | 264 | 27.7 | 390 | 1146 | 2.99 |

TABLE A3-2

Welding Parameters 1

| File/Weld | WFR_max (m/min) | WFR_med (m/min) | WFR_min (m/min) | WFR_rev (m/min) | T_dwell (ms) | Iarc_max (Amps) | Tarc_max (ms) | Iarc_ramp1 (Amps/ms) | Iarc_med (Amps) |
|---|---|---|---|---|---|---|---|---|---|
| W1115 | 25 | 25 | 35 | 20 | 3.0 | 350 | 1.5 | 150 | 350 |
| W1120 | 30 | 30 | 40 | 20 | 2.0 | 350 | 10.0 | 50 | 250 |
| W1130 | 35 | 35 | 20 | 30 | 1.0 | 350 | 7.0 | 100 | 250 |
| W1300 | 35 | 35 | 20 | 35 | 1.5 | 375 | 5.0 | 100 | 275 |

TABLE A3-3

Welding Parameters 2

| File/Weld | Tarc_med (ms) | Iarc_ramp2 (Amps/ms) | Iarc_min (Amps) | I_backgr (Amps) | T_wetting (ms) | Isc_max (Amps) | Isc_ramp (Amps/ms) | V_sc (Volts) | V_arc (Volts) |
|---|---|---|---|---|---|---|---|---|---|
| W1115 | 5.0 | 150 | 80 | 20 | 0.5 | 350 | 150 | 8.0 | 18.0 |
| W1120 | 5.0 | 50 | 80 | 20 | 0.5 | 350 | 150 | 8.0 | 18.0 |
| W1130 | 2.0 | 100 | 125 | 20 | 0.5 | 350 | 150 | 8.0 | 18.0 |
| W1300 | 5.0 | 100 | 80 | 20 | 0.5 | 350 | 150 | 8.0 | 18.0 |

TABLE A3-4

Comments

| File/Weld | Comments |
|---|---|
| W1115 | Low spatter, especially for the average wire feed rate. |
| W1120 | Spatter higher than w1115. 350 A/10 ms seems limit for not causing pulse detachment of droplet during arcing. |
| W1130 | Nice bead, lower spatter and s/c time due to higher reverse wire feed speed. |
| W1300 | Nice bead, low to medium spatter. Increasing WFR_max causes stubbing & high spatter. |

Example 2

Statistics and Parameter Settings for Selected Welds:

0.9 mm AWS A5.18 ER70S-6 electrode, 35 mm CTWD, $CO_2$ shielding.

TABLE A4-1

Weld Statistics

| File/Weld | Avg wire feed rate (m/min) | Short-cct frequency (Hz) | Stability index | Mean current (Amps) | RMS current (Amps) | Mean voltage (Volts) | Travel speed (mm/min) | Heat input (J/mm) | Mean dip time (ms) |
|---|---|---|---|---|---|---|---|---|---|
| W1200 | 18.6 | 43 | 0.80 | 171 | 184 | 30.4 | 390 | 844 | 4.37 |
| W1205 | 19.7 | 50 | 0.87 | 175 | 190 | 29.2 | 390 | 845 | 4.26 |
| W1210 | 21.0 | 48 | 0.86 | 181 | 195 | 30.3 | 390 | 905 | 4.41 |
| W1215 | 19.9 | 46 | 0.94 | 178 | 190 | 30.6 | 390 | 889 | 4.43 |

TABLE A4-2

Welding Parameters 1

| File/Weld | WFR_max (m/min) | WFR_med (m/min) | WFR_min (m/min) | WFR_rev (m/min) | T_dwell (ms) | Iarc_max (Amps) | Tarc_max (ms) | Iarc_ramp1 (Amps/ms) | Iarc_med (Amps) |
|---|---|---|---|---|---|---|---|---|---|
| W1200 | 30 | 30 | 40 | 30 | 1.5 | 250 | 4.0 | 100 | 175 |
| W1205 | 35 | 35 | 40 | 30 | 1.5 | 240 | 4.0 | 100 | 210 |
| W1210 | 40 | 40 | 40 | 35 | 1.5 | 240 | 4.0 | 100 | 210 |
| W1215 | 35 | 35 | 40 | 30 | 1.5 | 250 | 4.0 | 100 | 175 |

TABLE A4-3

Welding Parameters 2

| File/Weld | Tarc_med (ms) | Iarc_ramp2 (Amps/ms) | Iarc_min (Amps) | I_backgr (Amps) | T_wetting (ms) | Isc_max (Amps) | Isc_ramp (Amps/ms) | V_sc (Volts) | V_arc (Volts) |
|---|---|---|---|---|---|---|---|---|---|
| W1200 | 10.0 | 100 | 80 | 20 | 0.5 | 250 | 150 | 8.0 | 18.0 |
| W1205 | 6.0 | 100 | 80 | 20 | 0.5 | 250 | 150 | 8.0 | 18.0 |
| W1210 | 7.5 | 100 | 80 | 20 | 0.5 | 250 | 150 | 8.0 | 18.0 |
| W1215 | 10.0 | 100 | 80 | 20 | 0.5 | 250 | 150 | 8.0 | 18.0 |

TABLE A4-4

Comments

| File/Weld | Comments |
|---|---|
| W1200 | Nice running condition, low spatter weld. Arcing times distribution slightly bimodal. |
| W1205 | Very low spatter weld, very good condition. |
| W1210 | Very low spatter weld, very good condition. |
| W1215 | Excellent condition, low spatter weld. |

Example 3

Statistics and Parameter Settings for Selected Welds:

1.2 mm AWS A5.18 ER70S-4 electrode, 16 mm CTWD, $CO_2$ shielding.

TABLE A5-1

Weld Statistics

| File/Weld | Avg wire feed rate (m/min) | Short-cct frequency (Hz) | Stability index | Mean current (Amps) | RMS current (Amps) | Mean voltage (Volts) | Travel speed (mm/min) | Heat input (J/mm) | Mean dip time (ms) |
|---|---|---|---|---|---|---|---|---|---|
| W9050 | 8.1 | 48 | 0.84 | 253 | 279 | 24.8 | 390 | 1103 | 3.65 |
| W9065 | 9.8 | 42 | 0.80 | 290 | 323 | 23.6 | 390 | 1228 | 5.40 |
| W9070 | 10.0 | 45 | 0.81 | 290 | 328 | 23.1 | 390 | 1229 | 5.45 |
| W9075 | 10.0 | 36 | 0.83 | 281 | 328 | 25.1 | 390 | 1276 | 5.25 |
| W9085 | 10.2 | 39 | 0.77 | 285 | 346 | 24.3 | 390 | 1293 | 5.01 |

TABLE A5-2

Welding Parameters 1

| File/Weld | WFR_max (m/min) | WFR_med (m/min) | WFR_min (m/min) | WFR_rev (m/min) | T_dwell (ms) | Iarc_max (Amps) | Tarc_max (ms) | Iarc_ramp1 (Amps/ms) | Iarc_med (Amps) |
|---|---|---|---|---|---|---|---|---|---|
| W9050 | 18 | 14 | 20 | 30 | 1.0 | 375 | 4.0 | 100 | 335 |
| W9065 | 20 | 22 | 36 | 32 | 1.0 | 425 | 4.0 | 100 | 425 |
| W9070 | 22 | 25 | 28 | 33 | 1.0 | 450 | 4.0 | 100 | 450 |
| W9075 | 24 | 26 | 20 | 35 | 1.0 | 490 | 4.0 | 100 | 490 |
| W9085 | 24 | 25 | 20 | 35 | 1.0 | 490 | 4.0 | 100 | 490 |

TABLE A5-3

Welding Parameters 2

| File/Weld | Tarc_med (ms) | Iarc_ramp2 (Amps/ms) | Iarc_min (Amps) | I_backgr (Amps) | T_wetting (ms) | Isc_max (Amps) | Isc_ramp (Amps/ms) | V_sc (Volts) | V_arc (Volts) |
|---|---|---|---|---|---|---|---|---|---|
| W9050 | 7.0 | 100 | 125 | 20 | 0.8 | 250 | 100 | 5.0 | 15.0 |
| W9065 | 7.0 | 100 | 125 | 20 | 0.8 | 250 | 100 | 5.0 | 15.0 |
| W9070 | 5.0 | 100 | 125 | 20 | 0.8 | 250 | 100 | 5.0 | 15.0 |
| W9075 | 5.0 | 100 | 125 | 20 | 0.8 | 300 | 100 | 5.0 | 15.0 |
| W9085 | 7.0 | 100 | 40 | 20 | 0.8 | 300 | 100 | 5.0 | 15.0 |

TABLE A5-4

Comments

| File/Weld | Comments |
|---|---|
| W9050 | Low to medium spatter. |
| W9065 | Medium spatter. Good stability and bead shape. |
| W9070 | Medium spatter. Good stability and bead shape. Slightly lower spatter than w9065 |
| W9075 | Low to medium spatter. Dip frequency a little low. No evidence of droplet detachment in arcing. Good bead with no edge flash. |
| W9085 | Low to low/medium spatter by reducing Iarc_min, also by reducing Tarc_med to sensible value. |

Example 4

Statistics and Parameter Settings for Selected Welds:

1.2 mm AWS A5.18 ER70S-4 electrode, 35 mm CTWD, $CO_2$ shielding.

TABLE A6-1

Weld Statistics

| File/Weld | Avg wire feed rate (m/min) | Short-cct frequency (Hz) | Stability index | Mean current (Amps) | RMS current (Amps) | Mean voltage (Volts) | Travel speed (mm/min) | Heat input (J/mm) | Mean dip time (ms) |
|---|---|---|---|---|---|---|---|---|---|
| W9450 | 11.6 | 33 | 0.92 | 214 | 247 | 28.3 | 390 | 1085 | 5.53 |
| W9460 | 13.2 | 40 | 0.92 | 240 | 269 | 27.6 | 390 | 1184 | 5.33 |
| W9465 | 13.6 | 41 | 0.90 | 243 | 272 | 27.9 | 390 | 1220 | 5.38 |
| W9475 | 13.7 | 42 | 0.91 | 255 | 275 | 29.3 | 390 | 1306 | 4.50 |
| W9485 | 14.7 | 43 | 0.86 | 264 | 287 | 28.3 | 390 | 1321 | 5.20 |
| W9495 | 16.0 | 39 | 0.87 | 265 | 292 | 27.9 | 390 | 1336 | 6.43 |

TABLE A6-2

Welding Parameters 1

| File/Weld | WFR_max (m/min) | WFR_med (m/min) | WFR_min (m/min) | WFR_rev (m/min) | T_dwell (ms) | Iarc_max (Amps) | Tarc_max (ms) | Iarc_ramp1 (Amps/ms) | Iarc_med (Amps) |
|---|---|---|---|---|---|---|---|---|---|
| W9450 | 18 | 16 | 25 | 30 | 1.0 | 375 | 4.0 | 100 | 350 |
| W9460 | 24 | 22 | 30 | 30 | 1.0 | 375 | 4._ | 100 | 350 |
| W9465 | 26 | 25 | 30 | 30 | 1.0 | 375 | 4.0 | 100 | 350 |
| W9475 | 26 | 23 | 30 | 30 | 1.0 | 375 | 4.0 | 100 | 300 |
| W9485 | 28 | 25 | 34 | 30 | 1.0 | 400 | 4.0 | 100 | 350 |
| W9495 | 31 | 30 | 40 | 35 | 1.0 | 450 | 4.0 | 100 | 350 |

TABLE A6-3

Welding Parameters 2

| File/Weld | Tarc_med (ms) | Iarc_ramp2 (Amps/ms) | Iarc_min (Amps) | I_backgr (Amps) | T_wetting (ms) | Isc_max (Amps) | Isc_ramp (Amps/ms) | V_sc (Volts) | V_arc (Volts) |
|---|---|---|---|---|---|---|---|---|---|
| W9450 | 7.0 | 100 | 100 | 20 | 0.8 | 250 | 100 | 5.0 | 15.0 |
| W9460 | 7.0 | 100 | 100 | 20 | 0.8 | 250 | 100 | 5.0 | 15.0 |
| W9465 | 7.0 | 100 | 100 | 20 | 0.8 | 250 | 100 | 5.0 | 15.0 |
| W9475 | 11.0 | 100 | 100 | 20 | 0.8 | 250 | 100 | 5.0 | 15.0 |
| W9485 | 7.0 | 100 | 150 | 20 | 0.8 | 250 | 100 | 5.0 | 15.0 |
| W9495 | 5.0 | 100 | 150 | 20 | 0.8 | 250 | 100 | 5.0 | 15.0 |

TABLE A6-4

Comments

| File/Weld | Comments |
|---|---|
| W9450 | Low spatter weld. Runs very well. Very low spatter for 1.2 mm wire. Good bead. Low dipping frequency. |
| W9460 | Low spatter. Not as low as w9450, but higher deposition rate & dipping frequency. Good bead shape. |
| W9465 | As for w9460. |
| W9475 | Low to medium spatter. Nice flat bead, no detachments. |
| W9485 | Low-medium spatter. Developed from w9465. Not quite as stable, but higher deposition rate. More spatter (consistently - no bursts) due to higher Iarc_min. Good welding condition. |
| W9495 | Low to medium spatter with bursts of high spatter (occasional detachment). |

Example 5

Statistics and Parameter Settings for Selected Welds:

0.9 mm AWS A5.18 ER70S-6 electrode, 15 mm CTWD, $CO_2$ shielding.

TABLE A7-1

Weld Statistics

| File/Weld | Avg wire feed rate (m/min) | Short-cct frequency (Hz) | Stability Index | Mean current (Amps) | RMS current (Amps) | Mean voltage (Volts) | Travel speed (mm/min) | Heat input (J/mm) | Mean dip time (ms) |
|---|---|---|---|---|---|---|---|---|---|
| W0157 | 11.8 | 83 | 0.82 | 186 | 197 | 17.5 | 1500 | 146 | 5.65 |
| W0171 | 13.1 | 77 | 0.89 | 191 | 205 | 17.7 | 1500 | 155 | 5.83 |
| W0174 | 14.5 | 79 | 0.81 | 195 | 209 | 19.4 | 1500 | 173 | 5.14 |
| W0177 | 12.0 | 88 | 0.79 | 194 | 204 | 17.8 | 1500 | 156 | 5.22 |

TABLE A7-2

Welding Parameters 1

| File/Weld | WFR_max (m/min) | WFR_med (m/min) | WFR_min (m/min) | WFR_rev (m/min) | T_dwell (ms) | Iarc_max (Amps) | Tarc_max (ms) | Iarc_ramp1 (Amps/ms) | Iarc_med (Amps) |
|---|---|---|---|---|---|---|---|---|---|
| W0157 | 38 | 38 | 38 | 20 | 0.25 | 250 | 4.0 | 100 | 85 |
| W0171 | 38 | 38 | 38 | 20 | 0.25 | 275 | 4.0 | 100 | 85 |
| W0174 | 38 | 38 | 38 | 20 | 0.25 | 275 | 4.5 | 100 | 85 |
| W0177 | 38 | 38 | 38 | 20 | 0.25 | 250 | 4.5 | 100 | 85 |

TABLE A7-3

Welding Parameters 2

| File/Weld | Tarc_med (ms) | Iarc_ramp2 (Amps/ms) | Iarc_min (Amps) | I_backgr (Amps) | T_wetting (ms) | Isc_max (Amps) | Isc_ramp (Amps/ms) | V_sc (Volts) | V_arc (Volts) |
|---|---|---|---|---|---|---|---|---|---|
| W0157 | 7.5 | 100 | 80 | 20 | 0.75 | 200 | 200 | 12.0 | 18.0 |
| W0171 | 7.5 | 100 | 80 | 20 | 0.75 | 200 | 200 | 12.0 | 18.0 |
| W0174 | 7.5 | 100 | 80 | 20 | 0.75 | 200 | 200 | 12.0 | 18.0 |
| W0177 | 7.5 | 100 | 80 | 20 | 0.75 | 200 | 200 | 12.0 | 18.0 |

TABLE A7-4

Comments

| File/Weld | Comments |
|---|---|
| W0157 | Low spatter, very good condition. |
| W0171 | Low spatter, very good condition. |
| W0174 | Low spatter, very good condition. |
| W0177 | Low spatter, very good condition. |

Example 6

Statistics and Parameter Settings for Selected Welds:

0.9 mm AWS A5.18 ER70S-6 electrode, 15 mm CTWD, Ar-23% $CO_2$ shielding.

TABLE A8-1

Weld Statistics

| File/Weld | Avg wire feed rate (m/min) | Short-cct frequency (Hz) | Stability index | Mean current (Amps) | RMS current (Amps) | Mean voltage (Volts) | Travel speed (mm/min) | Heat input (J/mm) | Mean dip time (ms) |
|---|---|---|---|---|---|---|---|---|---|
| W0527 | 10.2 | 96 | 0.65 | 163 | 183 | 16.1 | 1500 | 123 | 3.7 |
| W0531 | 9.1 | 83 | 0.71 | 161 | 175 | 16.4 | 1500 | 123 | 4.75 |
| W0534 | 10.2 | 88 | 0.74 | 172 | 206 | 16.5 | 1500 | 134 | 4.4 |
| W0537 | 9.3 | 81 | 0.72 | 165 | 178 | 15.4 | 1500 | 121 | 5.38 |

TABLE A8-2

Welding Parameters 1

| File/Weld | WFR_max (m/min) | WFR_med (m/min) | WFR_min (m/min) | WFR_rev (m/min) | T_dwell (ms) | Iarc_max (Amps) | Tarc_max (ms) | Iarc_ramp1 (Amps/ms) | Iarc_med (Amps) |
|---|---|---|---|---|---|---|---|---|---|
| W0527 | 28 | 28 | 28 | 20 | 0.25 | 250 | 4.0 | 100 | 80 |
| W0531 | 28 | 28 | 28 | 20 | 0.25 | 250 | 4.0 | 100 | 80 |
| W0534 | 30 | 30 | 30 | 20 | 0.25 | 250 | 4.0 | 100 | 80 |
| W0537 | 32 | 32 | 32 | 20 | 0.25 | 250 | 4.0 | 100 | 80 |

TABLE A8-3

Welding Parameters 2

| File/Weld | Tarc_med (ms) | Iarc_ramp2 (Amps/ms) | Iarc_min (Amps) | I_backgr (Amps) | T_wetting (ms) | Isc_max (Amps) | Isc_ramp (Amps/ms) | V_sc (Volts) | V_arc (Volts) |
|---|---|---|---|---|---|---|---|---|---|
| W0527 | 7.5 | 100 | 80 | 20 | 0.75 | 200 | 200 | 12.0 | 18.0 |
| W0531 | 7.5 | 100 | 80 | 20 | 0.75 | 150 | 200 | 12.0 | 18.0 |
| W0534 | 7.5 | 100 | 80 | 20 | 0.75 | 150 | 200 | 12.0 | 18.0 |
| W0537 | 7.5 | 100 | 80 | 20 | 0.75 | 150 | 200 | 12.0 | 18.0 |

TABLE A8-4

Comments

| File/Weld | Comments |
|---|---|
| W0527 | Low to medium spatter. |
| W0531 | Low to medium spatter. |
| W0534 | Low to medium spatter. |
| W0537 | Low to medium spatter. |

Figure 5:
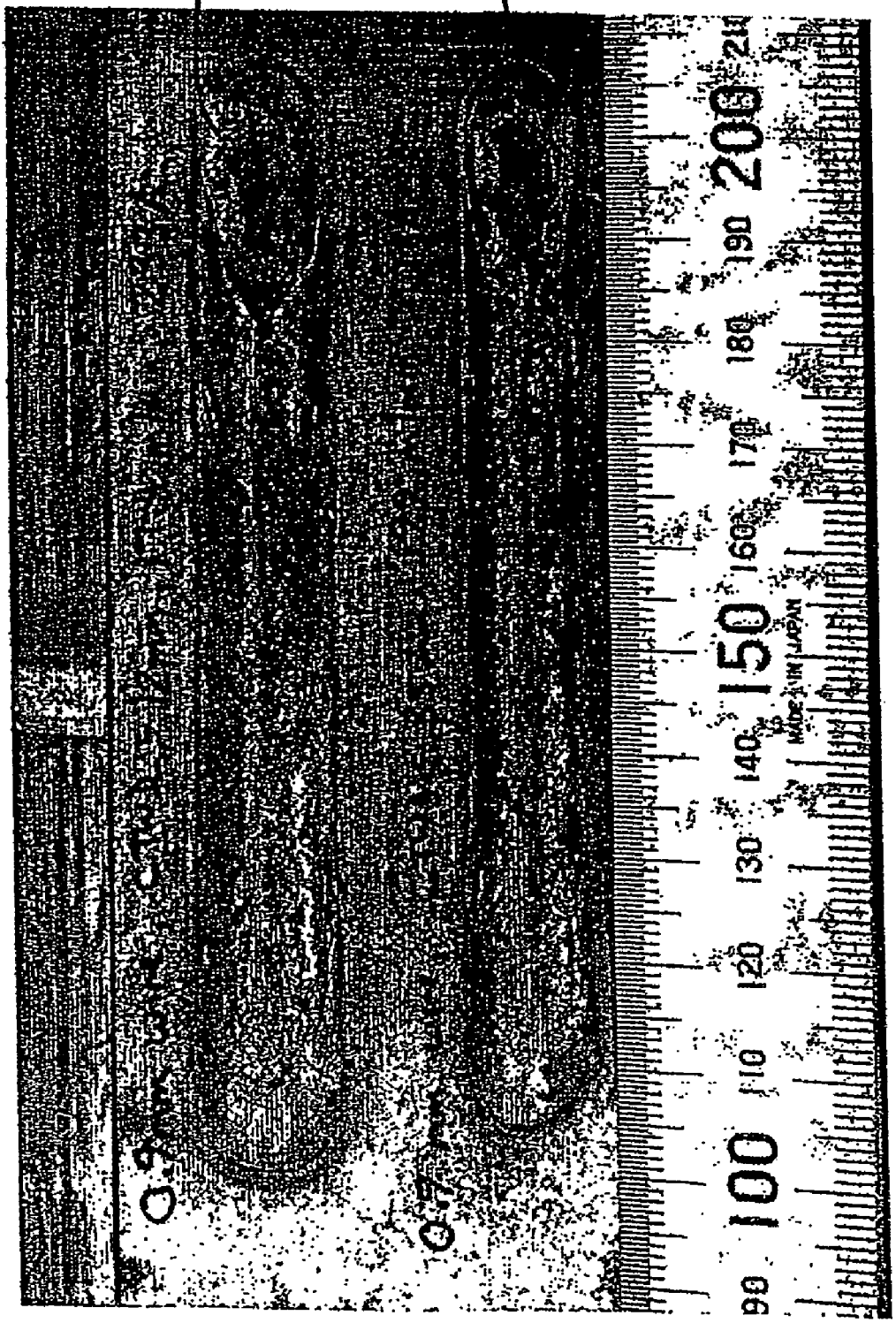
FIG. 5 are photographs of weld beads (0.9 mm wire) using the system of FIG. 1.

FIG. 5 is a photograph of weld beads (26, 27) produced using 0.9 mm wire. The upper weld 26 was performed using the W1300 parameter set, while the lower weld 27 used the W1215 parameter set.

The deposition rates achieved with 1.2 mm electrodes using short-circuiting transfer are comparable to those described in the literature using pulsed spray transfer. The major advantage of short-circuiting transfer is reduced spatter and improved arc stability, with a consequent improvement in "operator appeal". The stability index for each weld was evaluated using the relationship:

$$\text{Stability Index} = 1 - \frac{\text{Std Deviation of weld cycle duration}}{\text{Mean Value of weld cycle duration}}$$

For $CO_2$ shielding all welds which were deemed to be suitable had stability indices greater than 0.80. Most welds achieved a stability index between 0.80 and 0.90. Exceptionally stable welds achieve indices up to 0.94, but these results are achieved when operating below 90% of the wire feed speeds listed in Table 1, and are most likely to be achieved at high CTWDs.

Short-circuiting transfer using conventional equipment can be performed up to approximately 9 m/min to obtain reasonable weld quality. Above this, increasing spatter and poor stability rapidly degrade the process. The results in the above table indicate a doubling of the deposition rate, while maintaining process quality.

Figure 6:
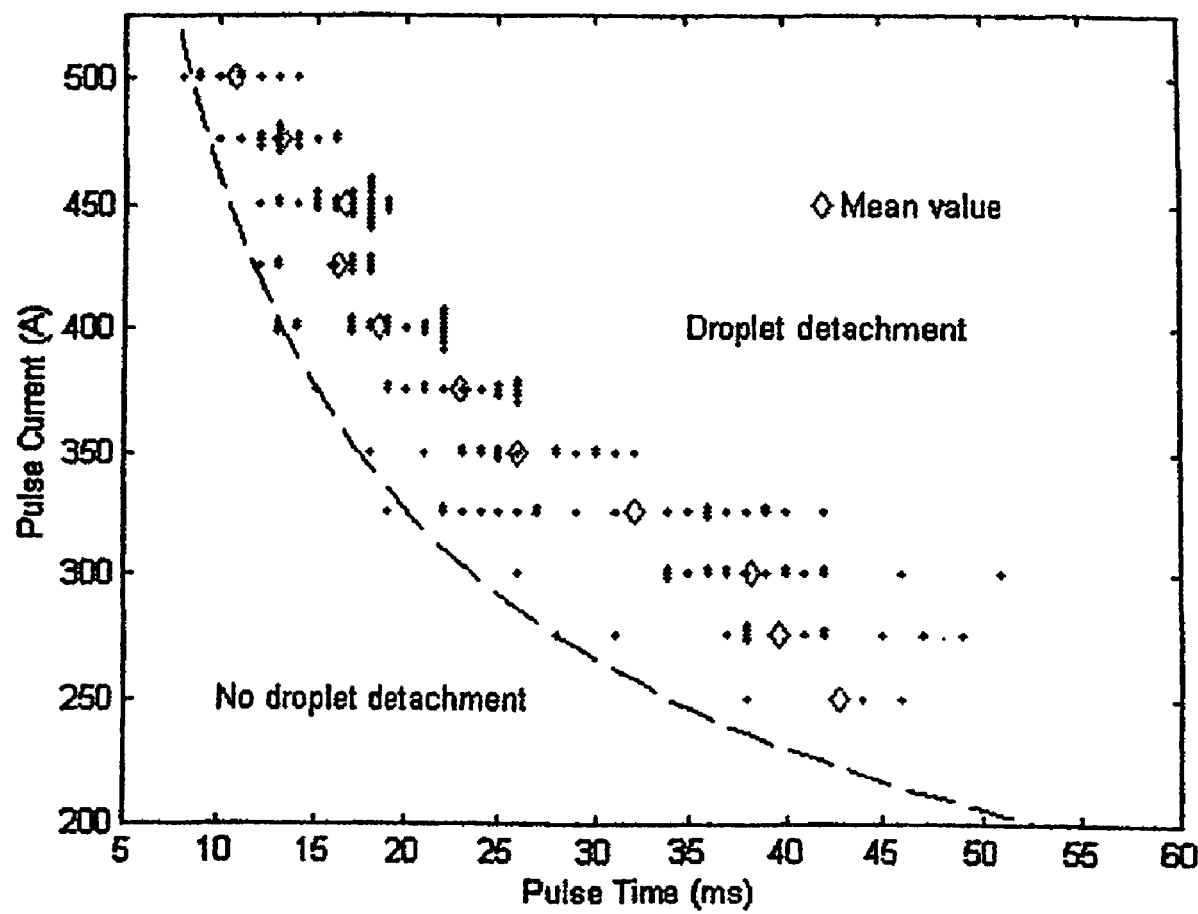
FIG. 6 is an $I_p$-$T_p$ relationship for 0.9 mm electrode in $CO_2$.

The frequency of most welds lies in the range of 35 to 96 Hz. These dipping frequencies are lower than those achieved by conventional short-circuiting processes (80 to 200 Hz). The lower frequencies are a result of the limitations within the process and its control. The first limitation is the dynamic response of the wire feeding system. A finite time is required to change the speed of the electrode, so an upper limit is placed on the rate at which molten droplets can be transferred via surface tension to the weld pool through electrode speed reversal. If the reversal is not achieved during the short-circuit transfer time, the wire tends to stub into the weld pool, and stability is lost. This first limitation is technological rather than fundamental. The second limitation is, however, fundamental to the process itself. As for argon-based shielding gases, there exists a relationship between the arcing pulse current $I_p$ and pulse time $t_p$ for which droplets will be produced and ejected from the electrode. While this is a desirable feature for pulsed spray transfer in argon based gases, it is undesirable for short-circuit transfer in $CO_2$, since free flight transfer is to be avoided. FIG. 6 shows the experimentally determined value of this relationship for a 0.9 mm ER70S-6 electrode at a CTWD of 12 mm. The relationship is expected to be influenced by changes in electrode preheating. The relationship in FIG. 6 is approximated by:

$$I^2 t \approx 2116(A^2 s)$$

The data points in FIG. 6 were determined by deliberately operating the process at large current pulse widths during the arcing period, and observing the droplet detachment through the recorded transient voltage waveform. The data points in the figures indicate that there is a very large variation in the detachment time when the process is operated in this manner.

Figure 7:
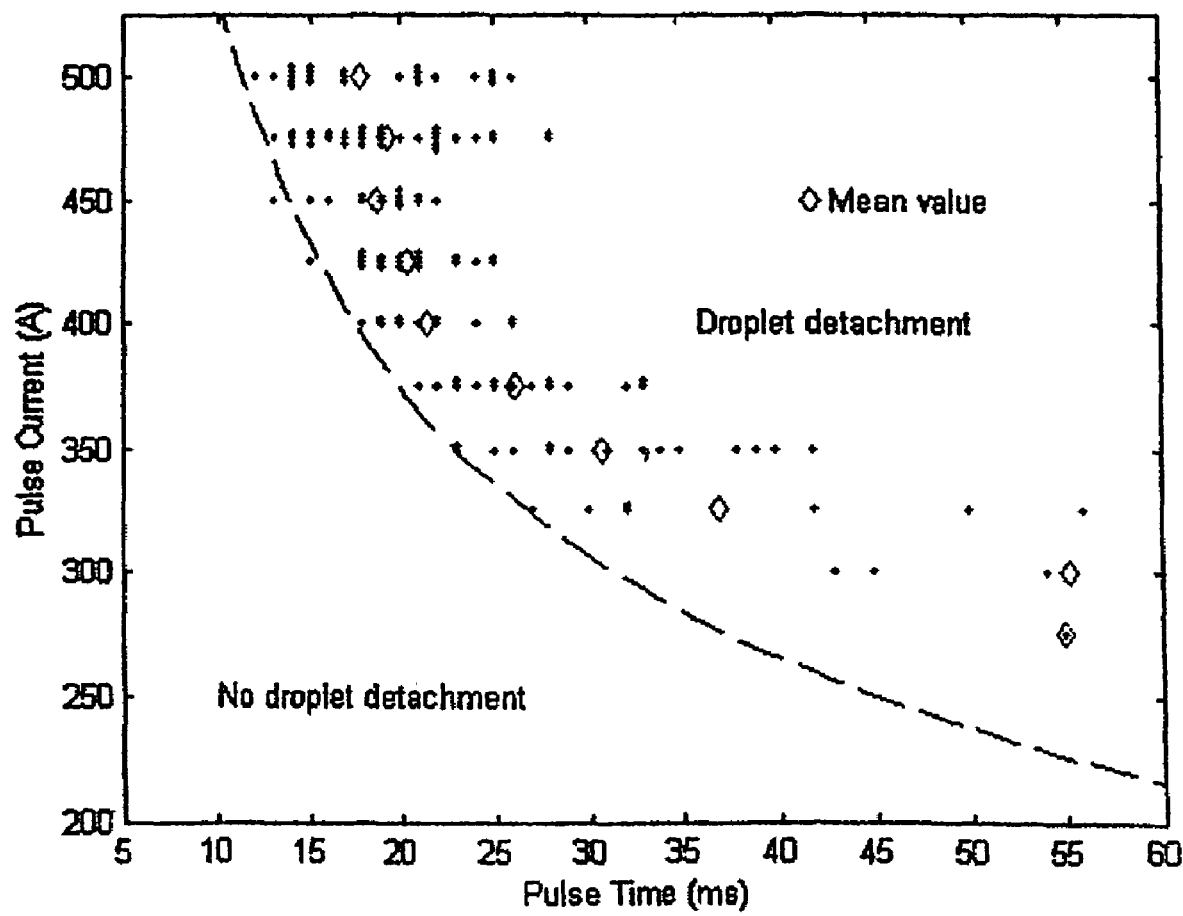
FIG. 7 is an $I_p$-$T_p$ relationship for 1.2 mm electrode in $CO_2$.

FIG. 7 shows the $I_p/t_p$ relationship for a 1.2 mm ER70S-4 electrode at a CTWD of 16 mm. The relationship in this figure is approximated by:

$$I^2 t \approx 2809(A^2 s)$$

Because of the need to avoid free flight transfer, the current pulse applied during the arcing period must be in the lower left hand region of FIGS. 6 and 7. This means there is an inherent limitation placed on the maximum size of droplet that can rapidly be developed during each arcing period. (A larger droplet can be formed by reducing the current to 100 A, say, but this reduces the melting rate and hence deposition rate). When combined with the dynamic limitations of the wire feeding mechanism, a limitation is placed on the maximum average electrode melting rate that can be achieved.

It is worth noting that the "no droplet detachment" region of FIGS. 6 and 7 is much larger for $CO_2$ than for argon mixtures. This behaviour is a key advantage for increasing the range of the short-circuiting transfer mode. If the behaviour of $CO_2$ closely mirrored that of argon mixtures, then the control methodology applied here would not be as effective; as difficulties would be encountered to develop a sufficiently large droplet during each arcing period to obtain the desired average melting rate.

A secondary factor which places additional restrictions to the process is the arc force generated by high pulse currents. Increasing the current during the arcing period to increase the rate of droplet growth will cause molten material to be ejected from the weld pool. Severe depression of the weld pool causes large oscillations and a deterioration of final bead shape. Increasing the CTWD effectively reduces the magnitude of the current required to produce a given droplet size in a given time, and simultaneously reduces the arc forces acting on the weld pool. This helps explain the higher deposition rates listed in Table 1. The compromise is a reduction in mean current and workpiece heating, but this may be an advantage for welding thin sections at high travel speeds.

In practical applications, the invention is ideally suited to automated systems. The need for rapid and well-controlled reversal of the electrode required that the drive motor is situated close to the contact tip. The torch design is well suitable for robotic systems since the electrode reel can be situated at some distance from the torch, provided that feeding friction is kept low.

It is to be appreciated that alterations and/or additions may be made to the parts and/or embodiments previously described without departing from the spirit or ambit of the invention.

The invention claimed is:

1. A method of controlling a welding process having a plurality of welding cycles, comprising:
    advancing and reversing a consumable electrode with respect to a workpiece; and
    dynamically regulating a rate of advancement and reversal of said consumable electrode within a short circuit welding cycle and instantaneously altering a melting rate of said consumable electrode during each of said plurality of welding cycles in response to predetermined voltage variations that are indicative of a short circuit or a short circuit rupture event that occurs during said short circuit welding cycle.

2. The method of claim 1, further comprising coordinating said instantaneous melting rate with said rate of advancement and reversal of said consumable electrode in response to said predetermined voltage variations.

3. The method of claim 1, further comprising controlling a source of power that is supplied to said consumable electrode.

4. The method of claim 3, wherein said source of power produces a current waveform.

5. The method of claim 1, further comprising monitoring a feedback signal associated with said welding process.

6. The method of claim 5, wherein said feedback signal includes a voltage for determining said short circuit or said short circuit rupture event.

7. The method of claim 6, wherein said feedback signal includes a current that is representative of said instantaneous melting rate.

8. The method of claim 1, further comprising sampling conditions associated with said welding process for a purpose of obtaining information for identifying said predetermined voltage variations.

9. The method of claim 8, further comprising processing said information to obtain a first reference signal for regulating said rate of advancement and reversal of said consumable electrode.

10. The method of claim 8, further comprising: sampling conditions associated with said welding process to obtain information for identifying said predetermined voltage variations, and processing said information to obtain a second reference signal for controlling said melting rate of said consumable electrode.

11. The method of claim 1, wherein said welding process uses a shielding gas.

12. The method of claim 11, wherein said shielding gas includes carbon dioxide.

13. The method of claim 1, wherein said welding system operates in a dip transfer mode wherein each welding cycle includes an arcing phase during which said consumable electrode is spaced from said workpiece and an arc is generated across said space, said arc being operative to form a molten droplet on an end of said consumable electrode, and a short circuit phase during which said consumable electrode is in contact with said workpiece, each welding cycle changing from said arcing phase to said short circuit phase on contact of said molten droplet with said workpiece, and changing from said short circuit phase to said arcing phase after rupturing of a bridge of molten material formed between said consumable electrode and said workpiece.

14. The method of claim 13, further comprising: conditioning said welding system to form a molten droplet on the electrode end during the arcing phase which has a diameter greater than the diameter of said consumable electrode, and causing said molten droplet to detach from said consumable electrode after said molten droplet has come into contact with said workpiece to thereby ensure a short circuit and arcing phase occurs in each welding cycle.

15. A short circuit arc welding system comprising:
    a power source, and
    a control unit and means for advancing and reversing a consumable electrode with respect to a workpiece during a welding process, said consumable electrode being energized by said power source to cause said consumable electrode to supply molten material to said workpiece, wherein said means for advancing and reversing is controlled by said control unit to dynamically regulate a rate of advancement and reversal of said consumable electrode within a short circuit welding cycle in response to an event occurring during said welding process indicated by predetermined voltage variations that are indicative of a short circuit or a short circuit rupture event that occurs during said short circuit welding cycle.

16. The welding system of claim 15, wherein said power source is controlled by said control unit in response to said predetermined voltage variations to control an instantaneous melting rate of said consumable electrode.

17. The welding system of claim 16, further comprising a means for obtaining a feedback signal associated with said welding process.

18. The welding system of claim 17, wherein said feedback signal is adapted to coordinate said instantaneous melting rate with said rate of advancement and reversal of said consumable electrode.

19. The welding system of claim 17, wherein said feedback signal includes a voltage for determining said short circuit or said short circuit rupture event.

20. The welding system of claim 19, wherein said feedback signal includes a current that is representative of said instantaneous melting rate of said consumable electrode.

21. The welding system of claim 15, wherein said control unit is adapted to sample conditions associated with said welding process to obtain information for identifying said predetermined voltage variations.

22. The welding system of claim 21, wherein said control unit is adapted to instantaneously process said information to obtain a first reference signal for regulating said rate of advancement and reversal of said consumable electrode in response to said predetermined voltage variations.

23. The welding system of claim 21, wherein said control unit is adapted to instantaneously process said information to obtain a second reference signal for controlling said melting rate of said consumable electrode in response to said predetermined voltage variations and to coordinate said melting rate with said rate of advancement and reversal of said consumable electrode.

24. The welding system of claim 15, wherein said welding process uses a shield gas.

25. The welding system of claim 24, wherein said shielding gas includes carbon dioxide.

26. The welding system of claim 15, wherein said welding system operates in a dip transfer mode over a plurality of welding cycles, wherein a welding cycle includes an arcing phase during which said consumable electrode is spaced from said workpiece and an arc is generated across said space, said arc being operative to form a molten droplet on the end of said consumable electrode, and a short circuit phase during which said consumable electrode is in contact with said workpiece, each welding cycle changing from said arcing phase to said short circuit phase on contact of said molten droplet with said workpiece, and changing from said short circuit phase to said arcing phase after rupturing of a bridge of molten material formed between said consumable electrode and said workpiece.

27. The welding system of claim 26, comprising: means for conditioning said welding system to form said molten droplet on an end of said consumable electrode during said arcing phase which has a diameter greater than a diameter of said consumable electrode, and means for causing said molten droplet to detach from said consumable electrode after said molten droplet has come into contact with said workpiece to thereby ensure a short circuit phase occurs in said welding cycle.

* * * * *